(12) United States Patent
He et al.

(10) Patent No.: US 9,171,306 B1
(45) Date of Patent: Oct. 27, 2015

(54) RISK-BASED TRANSACTION AUTHENTICATION

(75) Inventors: Xu He, Charlotte, NC (US); Robert Timothy Leedy, Jr., Belmont, NC (US); Todd Inskeep, Charlotte, NC (US); David Shroyer, Charlotte, NC (US); George C. Schroth, Scranton, PA (US)

(73) Assignee: Bank of America Corporation, Charlotte, NC (US)

( * ) Notice: Subject to any disclaimer, the term of this patent is extended or adjusted under 35 U.S.C. 154(b) by 743 days.

(21) Appl. No.: 12/748,667

(22) Filed: Mar. 29, 2010

(51) Int. Cl.
| | | |
|---|---|---|
| G06Q 20/04 | (2012.01) | |
| G06Q 40/02 | (2012.01) | |
| G06Q 20/40 | (2012.01) | |
| G06Q 30/06 | (2012.01) | |
| G07F 7/08 | (2006.01) | |
| G06Q 30/00 | (2012.01) | |

(52) U.S. Cl.
CPC .................................. *G06Q 30/0185* (2013.01)

(58) Field of Classification Search
USPC ............... 705/44, 1.1–912; 455/558; 235/380
See application file for complete search history.

(56) References Cited

U.S. PATENT DOCUMENTS

| | | | |
|---|---|---|---|
| 5,819,226 | A | 10/1998 | Gopinathan et al. |
| 5,884,289 | A | 3/1999 | Anderson et al. |
| 5,930,764 | A | 7/1999 | Melchione et al. |
| 6,029,154 | A | 2/2000 | Pettitt |
| 6,094,643 | A | 7/2000 | Anderson et al. |
| 6,095,413 | A | 8/2000 | Tetro et al. |
| 6,122,624 | A | 9/2000 | Tetro et al. |
| 6,418,436 | B1 | 7/2002 | Degen et al. |
| 6,516,056 | B1 | 2/2003 | Justice et al. |
| 6,526,389 | B1 | 2/2003 | Murad et al. |
| 7,403,922 | B1 | 7/2008 | Lewis et al. |
| 7,428,531 | B2 | 9/2008 | Barron et al. |
| 7,500,598 | B2 | 3/2009 | Davis et al. |
| 7,543,741 | B2 | 6/2009 | Lovett |
| 7,818,229 | B2 | 10/2010 | Imrey et al. |
| 7,824,045 | B2 | 11/2010 | Zhao |
| 7,827,045 | B2 | 11/2010 | Madill, Jr. et al. |
| 7,865,427 | B2 | 1/2011 | Wright et al. |
| 7,949,574 | B2 | 5/2011 | Patel et al. |
| 7,962,382 | B1 | 6/2011 | Tancredi et al. |

(Continued)

OTHER PUBLICATIONS

"Fraud Prevention Strategies for Internet Banking," BITS Financial Services Roundtable, Apr. 2003, Washington DC.

(Continued)

*Primary Examiner* — Jonathan Ouellette
(74) *Attorney, Agent, or Firm* — Weiss & Arons LLP; Michael A. Springs, Esq.

(57) ABSTRACT

Apparatus and methods for authorizing an exchange between a customer and a services provider. The apparatus may include an electronic processor that is configured to: (1) calculate a reference event profile; and (2) determine a difference between a prospective transaction profile and the reference event profile. The prospective transaction profile may be based on the initiation of a prospective transaction by an individual whose identity has not been verified. The reference event profile may be based on a plurality of customer events that correspond to one or many different customers. The apparatus may include an output device that is configured to output authentication test information that corresponds to the difference. The authentication test information may support a revised prospective transaction profile that is more similar to the reference event profile than is the initial prospective event profile.

21 Claims, 4 Drawing Sheets

(56) References Cited

U.S. PATENT DOCUMENTS

| | | |
|---|---|---|
| 8,296,205 B2 | 10/2012 | Zoldi |
| 2002/0147604 A1 | 10/2002 | Slate, II et al. |
| 2002/0188497 A1 | 12/2002 | Cerwin |
| 2002/0194119 A1* | 12/2002 | Wright et al. ............... 705/38 |
| 2003/0069820 A1 | 4/2003 | Hillmer et al. |
| 2003/0097330 A1 | 5/2003 | Hillmer et al. |
| 2004/0064401 A1 | 4/2004 | Palaghita et al. |
| 2004/0186770 A1 | 9/2004 | Pettit et al. |
| 2005/0177510 A1 | 8/2005 | Hilt et al. |
| 2006/0143079 A1 | 6/2006 | Basak et al. |
| 2007/0061190 A1 | 3/2007 | Wardell |
| 2008/0010203 A1 | 1/2008 | Grant |
| 2008/0103972 A1* | 5/2008 | Lanc ............................ 705/44 |
| 2009/0006230 A1 | 1/2009 | Lyda et al. |
| 2009/0248465 A1 | 10/2009 | Recce et al. |
| 2010/0094768 A1 | 4/2010 | Miltonberger |
| 2011/0131122 A1 | 6/2011 | Griffin et al. |
| 2011/0166979 A1 | 7/2011 | Zoldi |

OTHER PUBLICATIONS

"Neovia Financial Implementing Solutions from Actimize, a Nice Systems Company, for Enhanced Card and Banking Fraud Prevention Leading Online Payments Processor to Better Protect Consumers and Merchants with Enterprise-Wide, Real-Time Fraud Protection," Nice Actimize News, Nov. 9, 2009, New York, New York.

"Fraud Detection: The First Line of Defense in the Battle Against Fraud," VeriSign Whitepaper, Jul. 25, 2008.

"Multi-Channel Authentication Via Mobile Banking: Assessing the Technologies, Vendors, and Solution Provider," Javelin Strategy & Research, Sep. 2009, Pleasanton, California.

\* cited by examiner

RISK-BASED TRANSACTION AUTHENTICATION

FIELD OF TECHNOLOGY

Aspects of the disclosure relate to providing apparatus and methods for evaluating risk associated with a transaction between a customer and a service provider. In particular, the disclosure relates to apparatus and methods for reducing fraud in a transaction involving a customer and a financial services provider.

BACKGROUND

A financial services provider typically offers a customer several different channels for accessing accounts and account information and for executing transactions using funds held in the accounts. Fraud perpetrators often attempt to use the customer's identity information and electronic device information to steal the customer's funds (ID fraud and IP fraud, respectively). The financial services provider, therefore, undertakes to identify prospective fraudulent transactions.

For example, when the customer initiates a transaction (whether involving fund transfer or information exchange), the financial services provider may execute an authentication process to ascertain that the individual who initiates the transaction is actually the customer. The financial services provider also may execute a risk management process to identify and reject prospective transactions that are likely to be fraudulent.

Because the financial institution does not scrutinize every prospective transaction sufficiently to remove all risk, a fraud perpetrator may gain illicit access to a portion of the customer's identity information. The perpetrator may, therefore, be able to satisfy requirements of the authentication process.

Also, the perpetrator may exploit the existence of the several different channels to make it more difficult for the financial services provider to perform the risk analysis. For example, the perpetrator may steal the customer's identity information in connection with an online transaction, use a telephone channel to establish account permissions and, then, withdraw customer funds using an ATM. If the financial services provider utilizes risk analysis and fraud detection that are not sensitive to cross-channel customer behavior and, therefore, cross-channel fraudulent activities, the customer and the financial services provider may be more vulnerable to cross-channel fraud.

It would be desirable, therefore, to provide apparatus and methods for adaptively adjusting authentication criteria in conformance with risk exposure, know, customer behavior, or a combination thereof.

It also would be desirable, therefore, to provide apparatus and methods for reducing cross-channel fraud.

SUMMARY OF THE INVENTION

Apparatus and methods for authorizing an exchange between a customer and a services provider are provided. The apparatus may include an electronic processor that is configured to: (1) calculate a reference event profile; and (2) determine a difference between a prospective transaction profile and the reference event profile. The prospective transaction profile may be based on the initiation of a prospective transaction by an individual whose identity has not been verified. The reference event profile may be based on a plurality of customer events that correspond to one or many different customers. The apparatus may include an output device that is configured to output authentication test information that corresponds to the difference. The authentication test information may support a revised prospective transaction profile that is more similar to the reference event profile than is the initial prospective event profile.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
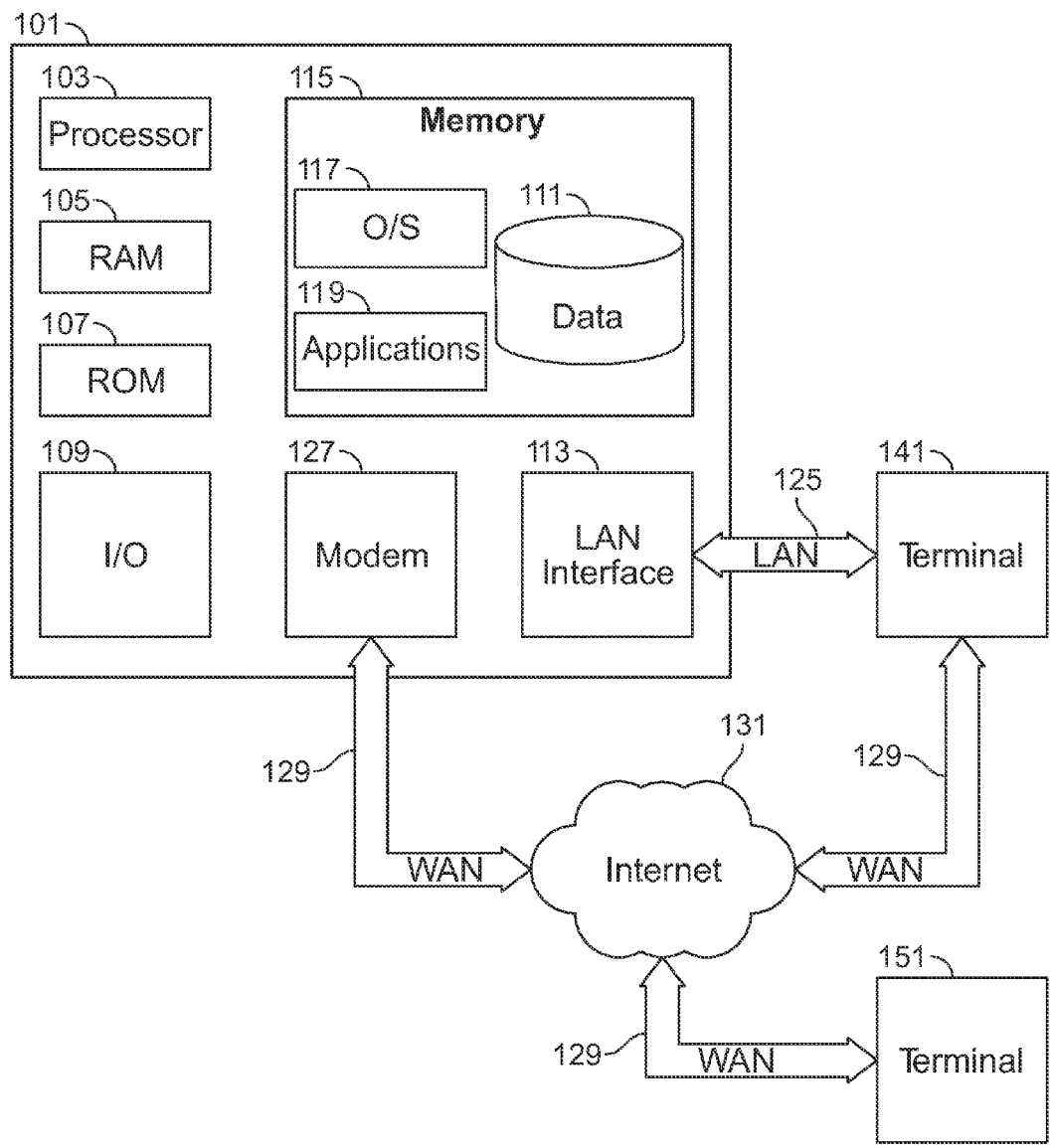
FIG. 1 shows illustrative apparatus that may be used in accordance with the principles of the invention.

Apparatus and methods in accordance with the principles of the invention may provide for authorizing an exchange between a customer and a services provider. The apparatus may include an electronic processor that is configured to: (1) calculate a reference event profile that includes a first event variable from a first information channel and a second event variable from a second information channel; and (2) determine a difference between a prospective transaction profile and the reference event profile. The prospective transaction profile may correspond to the customer. The reference event profile may be based on a plurality of customer events that correspond to many different customers. The reference event profile may be representative of the customer events of the many different customers.

The first information channel may be different from the second information channel. The apparatus may include an output device that is configured to output for the customer an indication of an authorization result.

In some embodiments, the processor may be configured to evaluate a risk score based on the difference. The authorization result may be based on the risk score and a threshold score. The threshold score may quantitatively correspond to a likelihood of a fraudulent act.

The first information channel may be an online banking services channel, an automatic teller machine network channel, an ecommerce channel, a banking center channel, any banking channel based on portable, wearable, bioelectronic, implantable communication devices or any other suitable information channel.

The second information channel may be an online banking services channel, an automatic teller machine network channel, an ecommerce channel, a banking center channel, any banking channel based on portable, wearable, bioelectronic, implantable communication devices or any other suitable information channel.

Apparatus and methods in accordance with the principles of the invention may provide for authenticating the customer in a transaction between the customer and a services provider. The apparatus may include an electronic processor configured to: (1) calculate a reference event profile that includes a first event variable from a first information channel and a second event variable from a second information channel; and (2) determine a difference between the prospective transaction profile and the reference event profile. The first information channel may be different from the second information channel. The apparatus may include an output device that is configured to output for a customer service associate authentication test information that corresponds to the difference.

The authentication test information may be based on the risk score and the threshold score. The threshold score may quantitatively correspond to a likelihood of a fraudulent act.

In some embodiments, the apparatus and methods may provide for calculating a customer reference profile based on a customer reference information channel; determining a difference between a prospective transaction profile and the customer reference profile; and outputting for the customer an indication of an authorization result.

In some embodiments, the apparatus and methods may provide for calculating a customer reference profile based on a customer reference information channel; determining a difference between a prospective transaction profile and the customer reference profile; and outputting authentication test information that is based on the difference.

In some embodiments, the customer reference information channel may be a primary customer reference information channel. In those embodiments, the apparatus and methods may calculate a secondary customer reference information channel. For example, a customer may primarily use online banking and secondarily use a banking center. The online banking channel may thus be the primary customer reference information channel and the banking center may be the secondary customer reference information channel.

The authentication test information may identify the secondary customer reference information channel as a basis for authenticating the customer. For example, if is impossible, inconvenient or impractical to authenticate the customer based on the primary customer reference information channel, the apparatus and methods may provide authentication test information that is based on the secondary customer reference information channel.

In some embodiments, there may be further subordinate customer reference information channels, such as a tertiary customer reference information channel. In some embodiments, the apparatus and methods may provide the primary and one or more subordinate customer reference information channels at the same time. In some embodiments, the apparatus and methods may provide authentication test information based on one, say, the highest ordered, customer reference information channel to a customer service associate. Authentication test information based on subordinate customer reference information channels may be provided subsequently as needed or appropriate.

The customer reference profile may be a profile that is based on event variables corresponding to common practices of a customer "C." For example, customer C may commonly pay bills using online banking. Customer C may transfer large amounts of funds by telephone. Customer C may deposit large amounts using a banking center. Customer C may withdraw large amounts using an ATM. These practices may define a customer reference profile for customer C.

The prospective transaction profile may be a profile that is based on event variables from a transaction that has not yet been authenticated or authorized, but is initiated in the name of customer C. (And, therefore, there may be no indicia that the transaction initiator is in fact customer C.) For example, an unauthenticated individual may initiate a large withdrawal at an ATM. A large withdrawal at an ATM is an event that supports a prospective transaction profile that may be consistent with the customer reference profile. Such a prospective transaction may not lead to a large risk score. Thus, the prospective transaction may not trigger a rejection. The unauthenticated individual may authenticate his identity (e.g., as customer C) and execute the transaction.

In another example, an unauthenticated individual may initiate, in the name of customer C, a large withdrawal at a banking center. A large withdrawal at a banking center is an event that supports a prospective transaction profile that may be inconsistent with the customer reference profile for customer C. Such a prospective transaction may lead to a large risk score. Because the prospective transaction profile is based on an information channel that is different from the customer reference information channel (as identified in the customer reference profile), there may be a likelihood of fraud. Thus, the prospective transaction may trigger a rejection.

In some embodiments, the transaction may not be rejected. For example, the unauthenticated individual may be provided with an opportunity to authenticate the prospective transaction based on event variables that would conform the prospective transaction profile to the customer reference profile for customer C.

For example, the apparatus may include an output device that is configured to output for a customer service associate authentication test information that is based on the difference. The authentication test information may require a revised prospective transaction profile. The revised prospective transaction profile may conform to the customer reference profile and thus have a lower risk score relative to the customer reference profile.

If the unauthenticated individual can conform to the revised prospective transaction profile, the risk score for the prospective transaction may be reduced and the transaction may be authenticated.

In some embodiments, the authentication test information may correspond to the customer reference information channel. In the foregoing example, the unauthenticated individual initiated a prospective transaction that generated a high risk score because the unauthenticated individual attempted to make a large withdrawal at a banking center. Customer C's customer reference profile indicates that Customer C usually handles large fund transfers by telephone using a call center.

The call center may have a record of the telephone number that Customer C uses to execute the large fund transfers. The authentication test information may include the telephone number. A customer service associate may use the telephone number to call Customer C. If Customer C answers the phone and consents to the withdrawal at the banking center, the transaction will have been authenticated. The authentication then will have been based on a revised prospective transaction profile that conforms to customer C's customer reference profile.

Table 1 lists illustrative event variables, information channels and event variable descriptions. The event variables may include customer account variables, transaction variables, equipment variables or any other suitable variables. Account variables may relate to a customer account. Transaction variables may relate to a transaction or prospective transaction in connection with the account. Equipment variables may be related to equipment that the customer uses to perform transactions or prospective transactions in connection with the account.

TABLE 1

Illustrative event variables, event variables and event variable descriptions.

| Event variable | Information channel(s)[1] | Event variable description |
|---|---|---|
| Customer account variables | | |
| Account opening date | ATM, BC, CC, OLB | State variable indicating account opening |
| Initial deposit amount | ATM, BC, CC, OLB | Dollar amount of initial deposit in financial institution account |
| Days to addition of title holder | ATM, BC, CC, OLB | Number of days between account inception and naming of additional account holder |
| Days to amendment of signatory authority | ATM, BC, CC, OLB | Number of days between account inception and granting of authority to withdraw funds from account |
| Frequency of balance inquiry | ATM, BC, CC, OLB | Number of balance inquiries per week, e.g. |
| Transaction variables | | |
| Days to transaction | ATM, BC | Number of days between account inception and transaction |
| Dollar value of transaction | ATM, BC, CC, OLB | Dollar value of transaction |
| %-balance of transaction | ATM, BC | Percentage of balance increased (deposit) or decreased (withdrawal) |
| Transaction location | ATM, BC | Geographic location of transaction |
| Transaction radius | ATM, BC | Distance between customer location (residence address, billing address, location at which account was opened, if at a BC, e.g.) |
| Equipment variables | | |
| Internet Protocol (IP) address | OLB | IP address of customer device that was used to execute transaction |
| Device identifier | ATM, OLB | MAC address or other unique device identifier |
| Cookie identifier | OLB | Identification information from cookie on customer device |
| Telephone number | CC | Telephone number from which call to CC originated |

[1]OLB = online banking; CC = call center; ATM = Automatic Teller Machine; BC = banking center.

One or more prospective transaction profiles may be analyzed relative to a reference event profile to quantify a risk score. An event profile may include two or more event variables, such as those listed in Table 1.

The reference event profile may be a representative profile, an average profile, a weighted average profile, a central profile, a cluster-defined profile, a fuzzy-cluster-defined profile or any other suitable profile.

The reference event profile may be based on historical events. The historical events may be constrained to an individual customer, a group of customers, all entity customers, or any suitable set of customers. The historical events may be constrained to one or more information channels. For example, the historical events may be drawn exclusively from the online banking channel or the ATM channel. In some embodiments, the historical events may be drawn from all available channels.

In some embodiments, the reference event profile may be constrained based on one more of the event variables. For example, a reference event profile may be based on accounts that were opened during a selected time period, that had initial deposits in a selected range, that had a withdrawal greater than a selected percentage of balance or any other suitable event variable constraint or constraints.

The prospective transaction profile may be based in or or in part on a customer's historical events, relatively recent events or events leading up to a transaction or prospective transaction that was initiated by or, in the name of, the customer.

The risk score may be calculated by evaluating a distance function for the distance between the prospective transaction profile and the reference event profile. Eq. 1 illustrates a risk score evaluation function:

$$\text{Risk Score} = \frac{\Delta_{(PTP-REP)}}{\Delta_{MAX}} \cdot 100 \qquad \text{Eq. 1}$$

In Eq. 1, $\Delta$ is a distance between prospective transaction profile PTP and reference event profile REP. $\Delta_{MAX}$ is a maximum distance between profiles upon which event profile REP is based. In some embodiments, the distance may be a distance between profile centers. In some embodiments, the distance may be an angular distance. In such embodiments, the angular distance may be based on a dot product. In some embodiments, the distance may be based on distance from a correlation function. In some embodiments, the distance may be based on distance from a distribution mean or mode. Any suitable distance function may be used. The distance may be based on any suitable one- or multi-dimensional regression analysis.

Table 2 shows an illustrative reference event profile and two illustrative prospective transaction profiles-"A" and "B," each accompanied by a risk score, all based on account and transaction event variables selected from Table 1.

TABLE 2

Illustrative profiles along with scores. (Underscored data are illustrative bases for differences between the scores.)

| Event variable | Reference event profile | | Prospective transaction profile A | | Prospective transaction profile B | |
|---|---|---|---|---|---|---|
| Account variables | | | | | | |
| Account opening date | January, 2008 | OLB | Feb. 1, 2008 | OLB | Feb. 20, 2008 | OLB |
| Initial deposit amount | $50,000 | OLB | $48,000 | OLB | $54,000 | OLB |
| Days to addition of title holder | 200 | OLB | 180 | OLB | 25 | CC |

TABLE 2-continued

Illustrative profiles along with scores. (Underscored data are illustrative bases for differences between the scores.)

| Event variable | Reference event profile | | Prospective transaction profile A | | Prospective transaction profile B | |
|---|---|---|---|---|---|---|
| Days to amendment of signatory authority | 204 | OLB | 180 | OLB | 25 | CC |
| Frequency of balance inquiry | 0.15/week | OLB | 0.12/week | OLB | 0.16/week | OLB |
| Transaction variables | | | | | | |
| Days to transaction | 400 | ATM | 365 | ATM | 27 | ATM |
| Dollar value of transaction | $12,500 | ATM | $16,000 | ATM | $13,500 | ATM |
| %-balance of transaction | 25% | ATM | 33% | ATM | 25% | ATM |
| Transaction location | New York | ATM | Chicago | ATM | ########[1] | ATM |
| Transaction radius | 100 miles | ATM | 500 miles | ATM | 12,000 miles | ATM |
| | | | RISK SCORE A: | 25 | RISK SCORE B: | 90 |

[1]Transaction location suppressed.

Risk score B (90) is greater than risk score A (25), because the distance between prospective transaction profile B and the reference event profile is greater than the distance between prospective transaction profile A and the reference event profile. The greater distance may be attributed to one or more differences in event variables. For example, in prospective transaction profile A, event variables track closely with event variables in the reference event profile. In prospective transaction profile B, however, "Days to addition of title holder" (25) and "Days to amendment of signatory authority" (also 25) are much less than that (200 and 204, respectively) in the reference event profile. Also, in prospective transaction profile B, the corresponding channels (both CC) for these event variables are different from those (both OLB) in the reference event profile. Discrepancies in "Days to transaction" and "Transaction radius" are also greater for prospective transaction profile B than they are for prospective transaction profile A.

In some embodiments, the reference event profile may be a customer reference profile. The customer reference profile may be calculated using one or more of the approaches discussed above in connection with reference event profile. The customer reference profile, however, may be limited to events that involved a particular customer, "customer C." The customer reference profile, therefore, is a profile that is characteristic of customer C's behavior, whereas the reference event profile may be characteristic of a population of customers' behavior.

One or more prospective transaction profiles may be analyzed relative to the customer reference profile to quantify a risk score that is associated with the prospective transaction. The prospective transaction may have been initiated by customer C. The prospective transaction may have been initiated by a fraud perpetrator posing as customer C.

The magnitude of the difference between (a) a prospective transaction profile based on the prospective transaction and (b) the customer reference profile may increase as the likelihood that the fraud perpetrator initiated the prospective transaction increases.

Prospective transaction profiles and customer reference profiles may include two or more event variables, such as those listed in Table 1. Risk scores A and B in Table 2 may be viewed for the sake of illustration as risk scores associated with two prospective transaction profiles, "A" and "B," which may represent prospective transactions initiated by customer C and a fraud perpetrator, respectively.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115. Server 101 may include one or more receiver modules, server modules and processors that may be configured to transmit and receive customer information, transaction information, customer profiles, risk scores and any other suitable information, and perform any other suitable tasks related to transaction authorization and customer authentication.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown). As described in detail below, database 111 may provide storage for customer information, transaction information, customer profiles, risk scores and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Any information described above in connection with database 121, and any other suitable information, may be stored in memory 125.

One or more of applications 119 may include one or more algorithms that may be used to perform one or more of the following: evaluating a risk score, determining whether to authorize a transaction, determining whether an authentication is sufficient and performing any other suitable tasks related to reducing transaction risk.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 2:
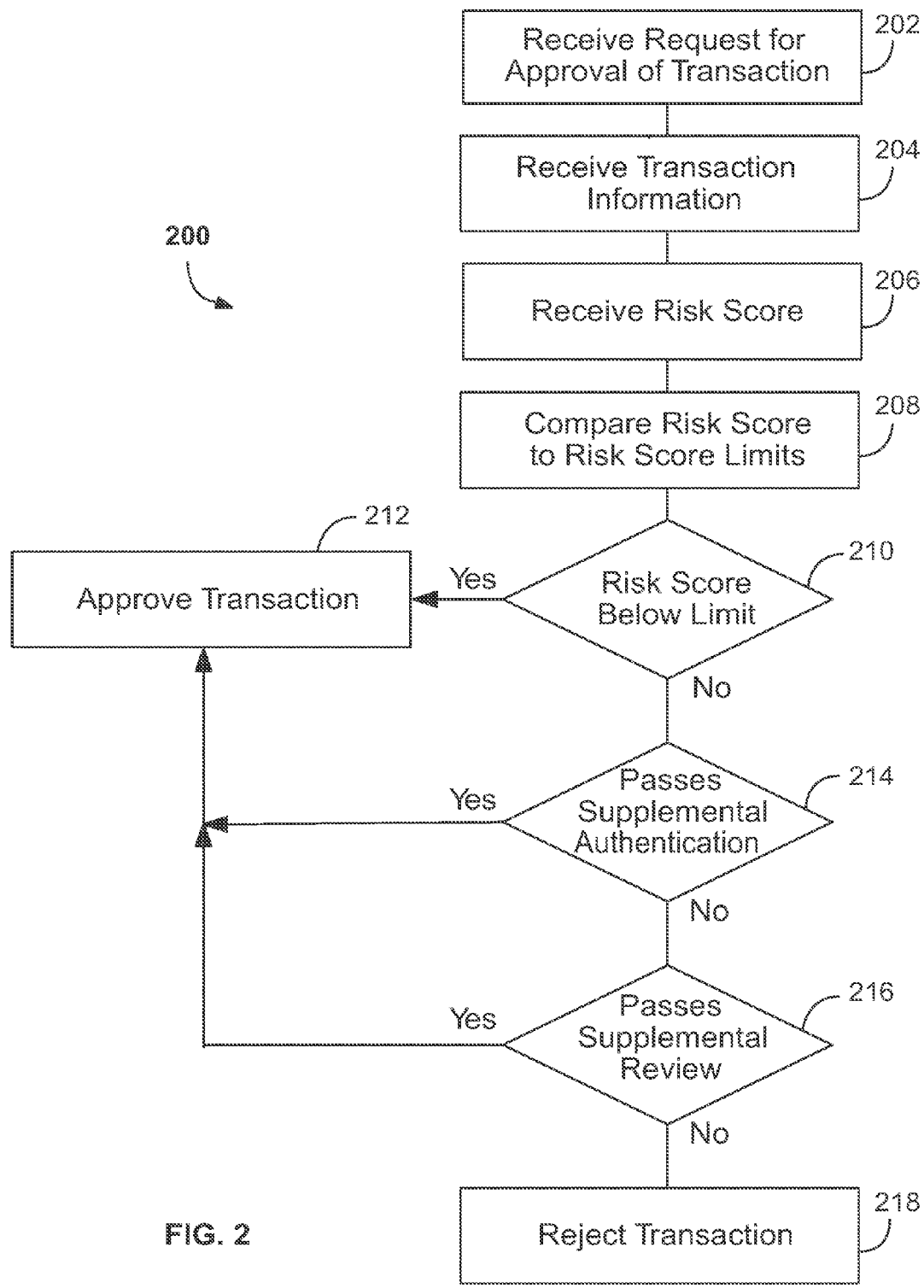
FIG. 2 shows illustrative steps of a process in accordance with the principles of the invention.
Figure 5:
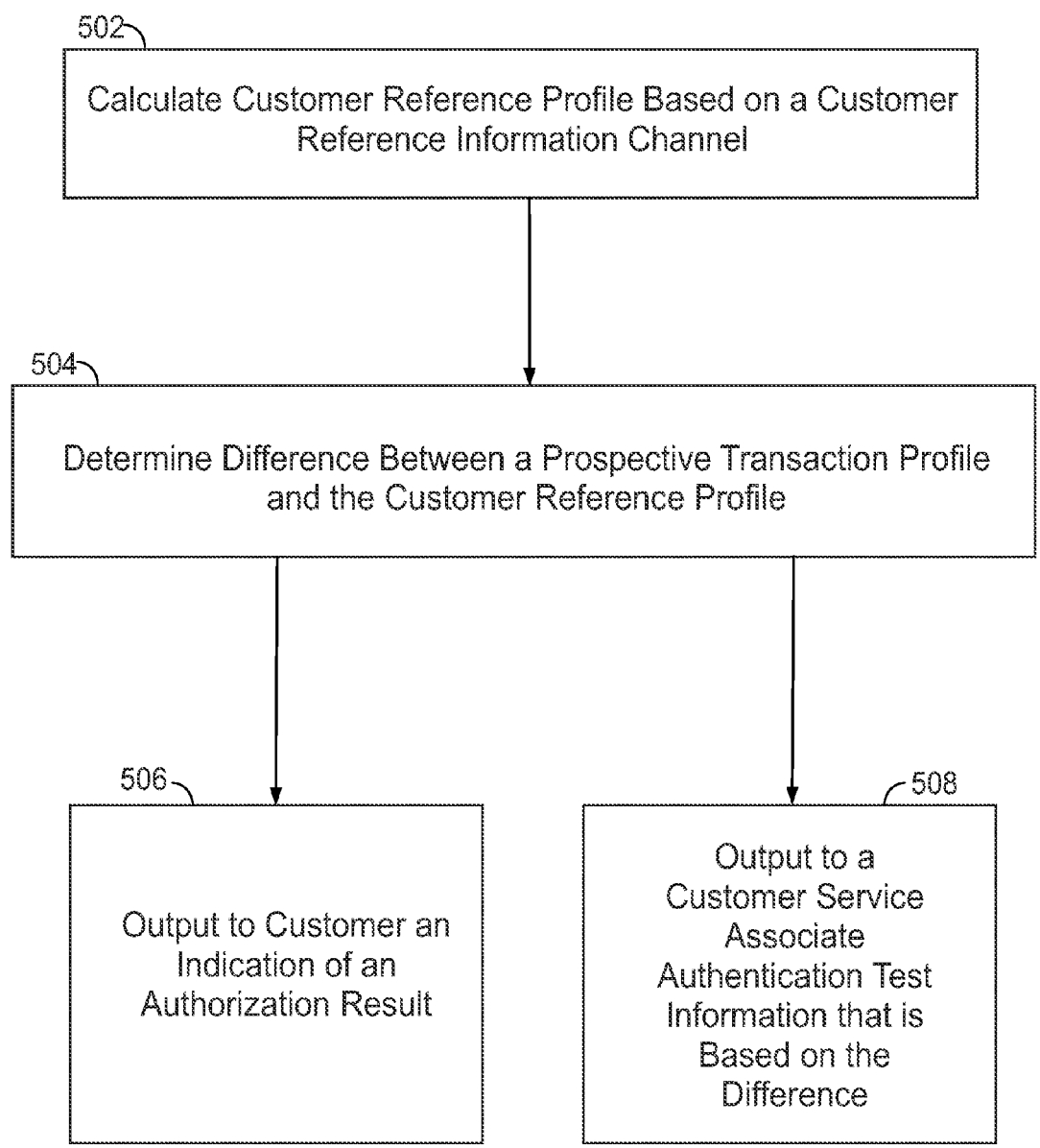
FIG. 5 shows illustrative steps of processes in accordance with the principles of the invention.

Processes in accordance with the principles of the invention may include one or more features of the process illustrated in FIGS. 2 and 5. For the sake of illustration, the steps of the processes illustrated in FIGS. 2 and 5 will be described as being performed by a "system". The "system" may include one or more of the features of the apparatus that are shown in FIG. 1 and/or any other suitable device or approach. The "system" may be provided by an entity. The entity may be an individual, an organization or any other suitable entity.

FIG. 2 shows illustrative process 200 for determining whether to approve a transaction. Process 200 may begin at step 202. At step 202, the system may receive a request from a requester (including an individual or another entity) for approval of a transaction. For example, the transaction may be a transaction between a customer and a merchant. The transaction may be between a first business and a second business. The transaction may be any suitable transaction.

The transaction may originate from a customer service channel. The customer service channel may be, for example, an online banking channel, a banking center channel, a call center channel, an automatic teller machine ("ATM") channel or any other suitable channel. Each customer service channel may include a corresponding information channel. For example, online banking information may flow through an online banking information channel.

At step 204, the system may receive transaction information. The transaction information may include any information that is communicated, or would be appropriate to communicate, from one transaction participant to another transaction participant in connection with the transaction. The transaction information may include customer information. The transaction information may include billing information.

The transaction information may include account information corresponding to a customer account. The account may be a credit account, a checking account, a savings account or any other suitable account.

The transaction information may include purchasing instrument information. The purchasing instrument may be a credit card, a debit card or any other suitable card for transactions, whether cashless or cash-based. The purchasing instrument may be a virtual purchasing instrument, which may be an electronic file that is stored on a customer device.

The transaction information may include customer equipment information. The customer equipment information may include information regarding—or stored on—a customer device such as a telephone, a PDA, a PC or any other suitable device (such as one of the devices identified in connection with FIG. 1). The equipment information may include, for example, an IP address, a device ID, a cookie, a phone number, a physical location and any other suitable equipment information.

The transaction information may include information items that correspond to one or more of the event variables listed in Table 1.

At step 206, the system may receive a risk score. The system may receive the risk score from a risk score engine. The risk score may be based on the customer's activities.

At step 208, the system may compare the risk score to a risk score limit.

At step 210, the system may determine if the risk score is below the limit that is appropriate for the transaction. If the risk score is below the limit, process 200 may continue at step 212. At step 212, the system may approve the transaction. If the risk score is not below the limit, process 200 may continue at step 214.

At step 214, the system may determine whether the transaction passes supplemental authentication. Supplemental authentication may be provided or supported by an authentication engine. The authentication engine may select an authentication approach based on the historical customer profile. The selected authentication approach may include or be based on knowledge-based authentication, voice authentication, one-time passcode authentication, biometric authentication or any other suitable approach to authentication. The authentication engine provide to a customer service associate one or more authentication test questions. The associate may present the test questions to the transaction requester. The test questions may be based on stored customer information, the risk score or any other suitable information.

In some embodiments, the authentication engine may request a one-time passcode to be entered. The authentication engine may request that the customer authenticate using biometrics at an AMT. The authentication engine may request that the customer call a call center to authenticate using voice authentication.

If at step 214 the system determines that the transaction passes supplemental authentication, process 200 may continue at step 212, as described above. If at step 214 the transaction does not pass supplemental authentication, process 200 may proceed at step 216.

At step 216, the system may determine whether the transaction passes supplemental review. Supplemental review may be performed by fraud analysts. If at step 216 the transaction passes supplemental review, process 200 may continue at step 212, as described above. If at step 216 the transaction does not pass supplemental review, process 200 may continue at step 218.

At step 218, the transaction may be rejected.

Figure 3:
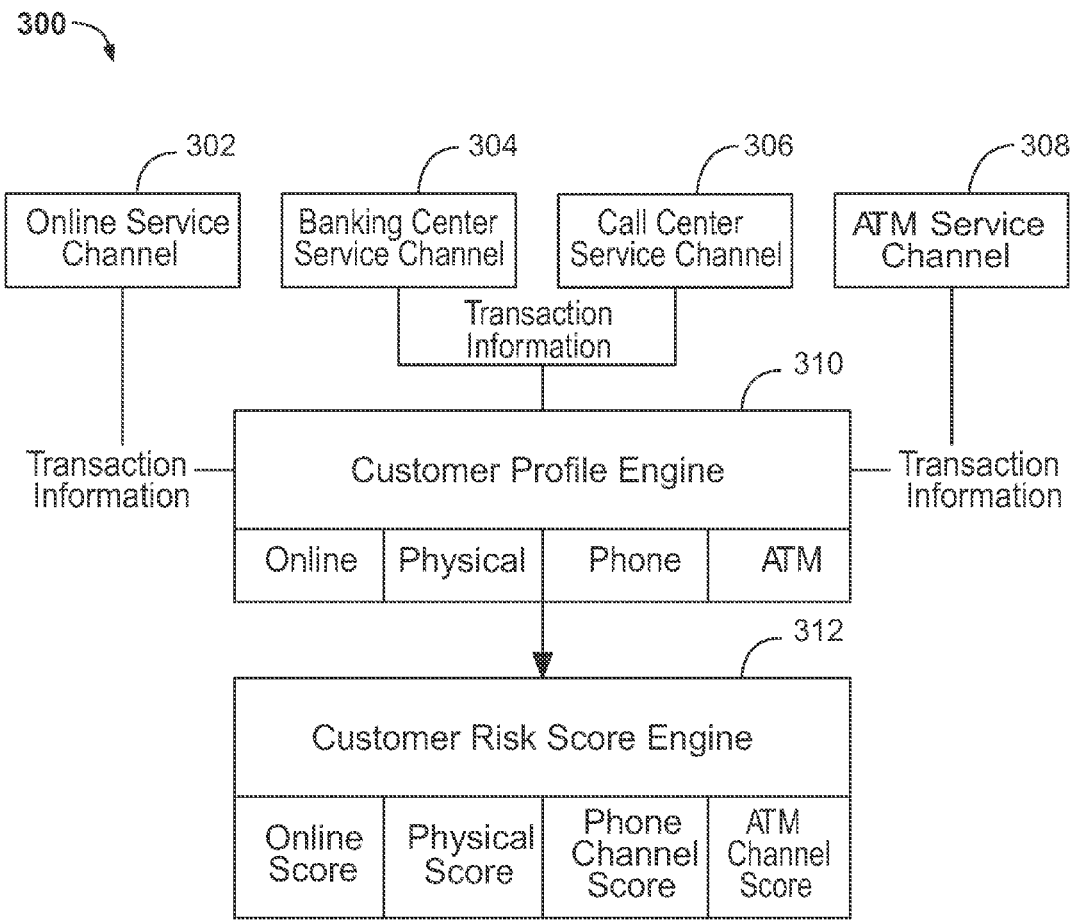
FIG. 3 shows an illustrative data processing arrangement in accordance with the principles of the invention.

FIG. 3 shows illustrative arrangement 300 for calculating a customer risk score. Process 200 (shown in FIG. 2) may involve the risk score at step 206. Service channels such as online service channel 302, banking center service channel 304, call center service channel 306, ATM service channel 308 and any other suitable service channel provide account and transaction services to a customer. The customer service channels transmit transaction information, along with any other suitable information, to customer profile engine 310.

Customer profile engine 310 may generate a customer profile for the customer for one or more of the service channels. Customer profile engine 310 may generate a customer profile for the customer for two or more of the service channels in aggregate.

Customer profile engine 310 may transmit one or more of the customer profiles to customer risk score engine 312. Customer risk score engine 312 may generate a customer risk score for the customer for one or more of the service channels. Customer risk score engine 312 may generate a customer risk score for the customer for two or more of the service channels in aggregate.

Figure 4:
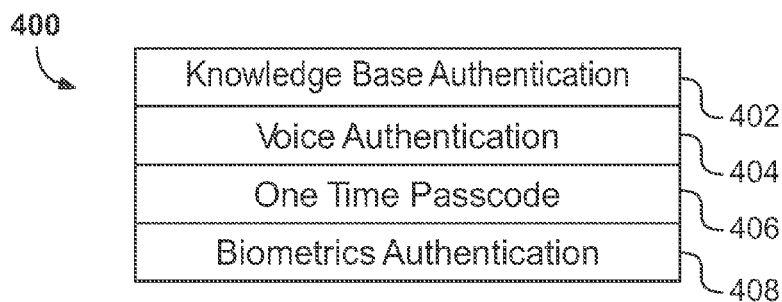
FIG. 4 shows another illustrative data processing arrangement in accordance with the principles of the invention.

FIG. 4 shows illustrative authentication engine 400. Authentication engine 400 may include one or more authentication modules such as knowledgebase authentication module 402, voice authentication module 404, one-time passcode authentication module 406, biometrics authentication module 408 and any other suitable authentication module.

Knowledgebase authentication module 402 may provide a customer service associate with factual bases for questions that may be presented to the customer to verify the customer's identity. The obscurity of the factual bases may increase with increasing customer risk score.

Voice authentication module 404 may include stored customer voice prints. A voice sample from an individual attempting to execute the transaction may be tested against the voice print to verify identity with the customer.

One time pass code module 406 may include use of a randomly generated one-time passcode, which may be in the form of a hardware token or sent via SMS to a mobile phone.

Biometrics authentication module 408 may verify customer identity based on fingerprint, iris print, facial signature, palm signature or any other suitable biometric feature.

FIG. 5 shows an illustrative process. The process shown in FIG. 5 may be used to reject a prospective transaction or reduce the risk of a prospective transaction. The process may begin at step 502. At step 502, the system may calculate a customer reference profile that includes an event involving a customer reference information channel and other historical events in which a customer, such as customer C, participated. At step 504, the system may determine a difference between a prospective transaction profile and the customer reference profile.

Steps 506 and 508 may be executed in the alternative or may be illustrative of two different embodiments of process 500.

At step 506, the system may output to the initiator of the prospective transaction an indication of an authorization result. For example, the prospective transaction may be denied or accepted.

At step 508, the system may output to a customer service associate authentication test information that is based on the difference between the customer reference profile and the prospective transaction profile. The authentication test information may instruct the customer service associate to verify the identity of the prospective transaction initiator based on authentication information from customer C's customer reference profile. For example, the authentication information may be based on customer C's reference information channel. Once the authentication is based on customer C's customer reference profile, the difference between the prospective transaction profile and customer C's reference profile may be reduced and the transaction may proceed with a lower risk score.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for reducing cross-channel fraud and adaptively adjusting authentication criteria in conformance with risk exposure have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for authenticating a customer in a banking transaction between the customer and a banking services provider, the apparatus comprising:
    an electronic processor module configured to:
        calculate a plurality of channel-specific customer reference profile values for a customer, each channel-specific customer reference profile value being (1) associated with a different customer reference information channel and (2) based on one or more event variables from a plurality of banking transactions conducted via the customer reference information channel, wherein:
            one of the customer reference information channels comprises an online banking services channel;
            a channel-specific customer reference profile associated with the online banking services channel is based in part on:
                a first event variable from a transaction conducted via the online banking services channel comprising an Internet Protocol address identifier, a device identifier or a cookie identifier; and
                a second event variable from a transaction conducted via the online banking services channel comprising a dollar value of transaction, percentage of balance or transaction location;
        determine a first prospective transaction profile value, wherein the first prospective transaction profile value is based on one or more event variables from a prospective banking transaction initiated in the name of the customer via one of the customer reference information channels,
        identify a first channel-specific customer reference profile value, the first channel-specific customer reference profile value corresponding to the customer reference information channel from the prospective banking transaction;
        determine a difference between the first prospective transaction profile value and the first channel-specific customer reference profile value; and
        generate a first risk score based on the difference between the first prospective transaction profile value and the first channel-specific customer reference profile value; and
    an output device configured to output authentication test information, the authentication test information based on the first risk score and a threshold score, wherein the threshold score quantitatively corresponds to the likelihood of a fraudulent act;
    wherein, when the first risk score exceeds the threshold score, the authentication test information is further configured to:
        identify a second prospective transaction profile with a second risk score, the second risk score based on a difference between the second prospective transaction profile and a second channel-specific customer reference profile value, wherein the second risk score does not exceed the threshold score, wherein the customer reference information channel that corresponds to the second channel-specific customer reference profile value is not the same as the customer reference information channel that corresponds to the first channel-specific customer reference profile value; and
        based on the second prospective transaction profile value, authenticate the transaction via the customer reference information channel that corresponds to the second channel-specific customer reference profile value.

2. The apparatus of claim 1 wherein the authentication test information corresponds to the customer reference information channel.

3. The apparatus of claim 2 wherein:
    the first prospective transaction profile value is based on an event variable from a prospective banking transaction initiated in the name of the customer via a banking center channel; and
    the second prospective transaction profile value is based on an event variable from a prospective banking transaction initiated in the name of the customer via a call center channel.

4. The apparatus of claim 3 wherein the authentication test information identifies a call center authentication approach.

5. The apparatus of claim 4 wherein the call center identification approach is selected based on the channel-specific customer reference profile value.

6. The apparatus of claim 2 wherein:
    the first prospective transaction profile value is based on an event variable from a prospective banking transaction initiated in the name of the customer via an online banking channel; and
    the second prospective transaction profile value is based on an event variable from a prospective banking transaction initiated in the name of the customer via a banking center channel.

7. The apparatus of claim 6 wherein the banking center channel authentication approach is selected based on the channel-specific customer reference profile value.

8. The apparatus of claim 7 wherein the authentication test information identifies a banking center channel authentication approach.

9. The apparatus of claim 1 wherein, when the customer reference information channel is a primary customer reference information channel, the authentication test information identifies a secondary customer reference information channel for authentication of the customer.

10. One or more non-transitory computer-readable storage media storing computer-executable instructions which, when executed by a processor on a computer system, perform a method for authenticating a customer in a transaction between the customer and a banking services provider, the instructions comprising:
    a first set of instructions for using an electronic processor module to calculate a plurality of channel-specific customer reference profile values for a customer, each channel-specific customer reference profile value being (1) associated with a different customer reference information channel and (2) based on one or more event variables from a plurality of banking transactions conducted via the customer reference information channel, wherein:
one of the customer reference information channels comprises an online banking services channel;
a first event variable from a transaction conducted via the online banking services channel comprises an Internet Protocol address identifier, a device identifier or a cookie identifier; and
a second event variable from a transaction conducted via the online banking services channel comprises a dollar value of transaction, percentage of balance or transaction location;
a second set of instructions for using the electronic processor module to determine a first prospective transaction profile value, wherein the first prospective transaction profile value is based on one or more event variables from a prospective banking transaction initiated in the name of the customer via one of the customer reference information channels, wherein:
a third set of instructions for using the electronic processor module to identify a first channel-specific customer reference profile value, the first channel-specific customer reference profile value corresponding to the customer reference information channel from the prospective banking transaction, and determine a difference between the first prospective transaction profile value and the first channel-specific customer reference profile value;
a fourth set of instructions for using the electronic processor module to generate a first risk score based on the difference between the first prospective transaction profile value and the first customer reference profile value; and
a fifth set of instructions for using an output device to output authentication test information that is based on the first risk score and a threshold score, wherein the threshold score quantitatively corresponds to the likelihood of a fraudulent act;
wherein, when the first risk score exceeds the threshold score, the authentication test information is further configured to:
identify a second prospective transaction profile value with a second risk score, the second risk score based on a difference between the second prospective transaction profile value and a second channel-specific customer reference profile value, wherein the second risk score does not exceed the threshold score, wherein the customer reference information channel that corresponds to the second channel-specific customer reference profile value is not the same as the customer reference information channel that corresponds to the first channel-specific customer reference profile value; and
based on the second prospective transaction profile value, authenticate the transaction via the customer reference information channel that corresponds to the second channel-specific customer reference profile value.

11. The media of claim 10 wherein, in the method, the authentication test information corresponds to the customer reference information channel.

12. The media of claim 11 wherein, in the method:
the first prospective transaction profile value is based on an event variable from a prospective banking transaction initiated in the name of the customer via a banking center channel; and
the second prospective transaction profile value is based on an event variable from a prospective banking transaction initiated in the name of the customer via a call center channel.

13. The media of claim 12 wherein, in the method, the authentication test information includes a customer telephone number from the call center channel.

14. The media of claim 11 wherein, in the method:
the first prospective transaction profile value is based on an event variable from a prospective banking transaction initiated in the name of the customer via an online banking channel; and
the second prospective transaction profile is based on an event variable from a prospective banking transaction initiated in the name of the customer via a banking center channel.

15. The media of claim 14 wherein, in the method, the authentication test information includes a driver's license number from the banking center channel.

16. A method for authenticating a customer in a transaction between the customer and a banking services provider, the method comprising:
using an electronic processor module:
calculating a plurality of channel-specific customer reference profile values for a customer, each channel-specific customer reference profile value being (1) associated with a different customer reference information channel and (2) based on one or more event variables from a plurality of banking transactions conducted via the customer reference information channel, a customer reference profile based on an event variable from a banking transaction conducted via a customer reference information channel, wherein:
one of the customer reference information channels comprises an online banking services channel;
a first event variable from a transaction conducted via the online banking services channel comprises an Internet Protocol address identifier, a device identifier or a cookie identifier; and
a second event variable from a transaction conducted via the online banking services channel comprises a dollar value of transaction, percentage of balance or transaction location;
determining a first prospective transaction profile value, wherein the first prospective transaction profile value is based on an event variable from a prospective banking transaction initiated in the name of the customer via one of the customer reference information channels
identifying a first channel-specific customer reference profile value, the first channel-specific customer reference profile value corresponding to the customer reference information channel from the prospective banking transaction;
determining a difference between the first prospective transaction profile value and the first channel-specific customer reference profile value; and,
generating a first risk score based on the difference between the first prospective transaction profile value and the first channel-specific customer reference profile value; and
using an output device, outputting authentication test information that is based on the first risk score and a threshold score, wherein the threshold score quantitatively corresponds to the likelihood of a fraudulent act;

wherein, when the risk score exceeds the threshold score, the authentication test information is further configured to:
- identify a second prospective transaction profile value with a second risk score, the second risk score based on a difference between the second prospective transaction profile value and a second channel-specific customer reference profile value, wherein the second risk score does not exceed the threshold score; and
- based on the second prospective transaction profile value, authenticate the transaction via the customer reference information channel that corresponds to the second channel-specific customer reference profile value.

17. The method of claim 16 wherein the authentication test information corresponds to the customer reference information channel.

18. The method of claim 17 wherein:
- the first prospective transaction profile value is based on an event variable from a prospective banking transaction initiated in the name of the customer via a banking center channel; and
- the second prospective transaction profile value is based on an event variable from a prospective banking transaction initiated in the name of the customer via a call center channel.

19. The method of claim 18 wherein the authentication test information includes a customer telephone number from the call center channel.

20. The method of claim 17 wherein:
- the first prospective transaction profile value is based on an event variable from a prospective banking transaction initiated in the name of the customer via an online banking channel; and
- the second prospective transaction profile value is based on an event variable from a prospective banking transaction initiated in the name of the customer via a banking center channel.

21. The method of claim 20 wherein the authentication test information includes a driver's license number from the banking center channel.

* * * * *